March 5, 1968 G. A. DUNCAN ETAL 3,371,934

PHONOGRAPH DEVICE

Filed Feb. 28, 1966 3 Sheets-Sheet 1

INVENTORS
GOLDA A. DUNCAN
ROBERT N. ALESON
BY
Mason & Graham
ATTORNEYS

PHONOGRAPH DEVICE

Filed Feb. 28, 1966 3 Sheets-Sheet 2

INVENTORS
GOLDA A. DUNCAN
ROBERT N. ALESON
BY
Moran & Graham
ATTORNEYS

INVENTORS
GOLDA A. DUNCAN
ROBERT N. ALESON
BY Moore & Graham
ATTORNEYS

United States Patent Office 3,371,934
Patented Mar. 5, 1968

3,371,934
PHONOGRAPH DEVICE

Golda A. Duncan, North Hollywood, and Robert N. Aleson, Sylmar, Calif., assignors, by direct and mesne assignments, to Lorraine Industries, Inc., Bridgeport, Conn.

Filed Feb. 28, 1966, Ser. No. 530,588
13 Claims. (Cl. 274—1)

ABSTRACT OF THE DISCLOSURE

The application discloses means in a mechanical phonograph device for playing sections of a phonograph record in predetermined sequence upon successive operations of the device. The means includes an apertured control disk over the record through which the needle extends, a means for advancing the disk each time the device is operated, and a means for limiting each operating cycle.

This invention relates to phonograph devices embodying repeat mechanisms.

An object of the invention is to provide a new and improved phonograph mechanism to play preselected predetermined numbers of turns of the spiral groove of a phonograph record in a predetermined sequence upon successive playing cycles.

Another object is to provide novel means for locating the needle of a sound reproducing means with respect to preselected areas of the record so that the needle will traverse the record groove turns of such given areas in a predetermined sequence.

A further object is to provide novel means for lifting a needle from a record and resetting the needle on a predetermined different portion of the record for the playing of such other portion.

A principal object is to provide an apertured control disk or "window disk" rotatably mounted in superimposed relation to a phonograph record with the openings or windows of the disk connected by needle guide grooves, together with guide wall means bordering the grooves and windows so that the needle cannot escape therefrom.

Another object is to provide a disk with openings or windows interconnected by grooves or tracks so shaped as to insure that whether the needle is retracted from any playing groove from the first to the last it will be directed toward the first playing groove of the following preselected portion upon actuation of the disk.

A further object is to provide inclined surfaces bordering the windows of the disk to effectuate a lifting of the needle the moment the window disk is rotated.

A still further object is to provide an apertured control disk having a trough-like passage between the apertures, certain portions of said trough being so shaped, not only to initially lift the needle from the record, but also to direct it toward the position required for the next play.

Still another object is to provide a novel phonograph construction wherein a single manually operable member is effective to energize a record drive means, to operate a needle reset and reorientation means, and to control the number of revolutions of the record on each playing cycle.

A further object is to provide a phonograph device in which the record also serves as the record turntable.

These and other objects will be apparent from the drawings and the following description. Referring to the drawings.

Figure 1:
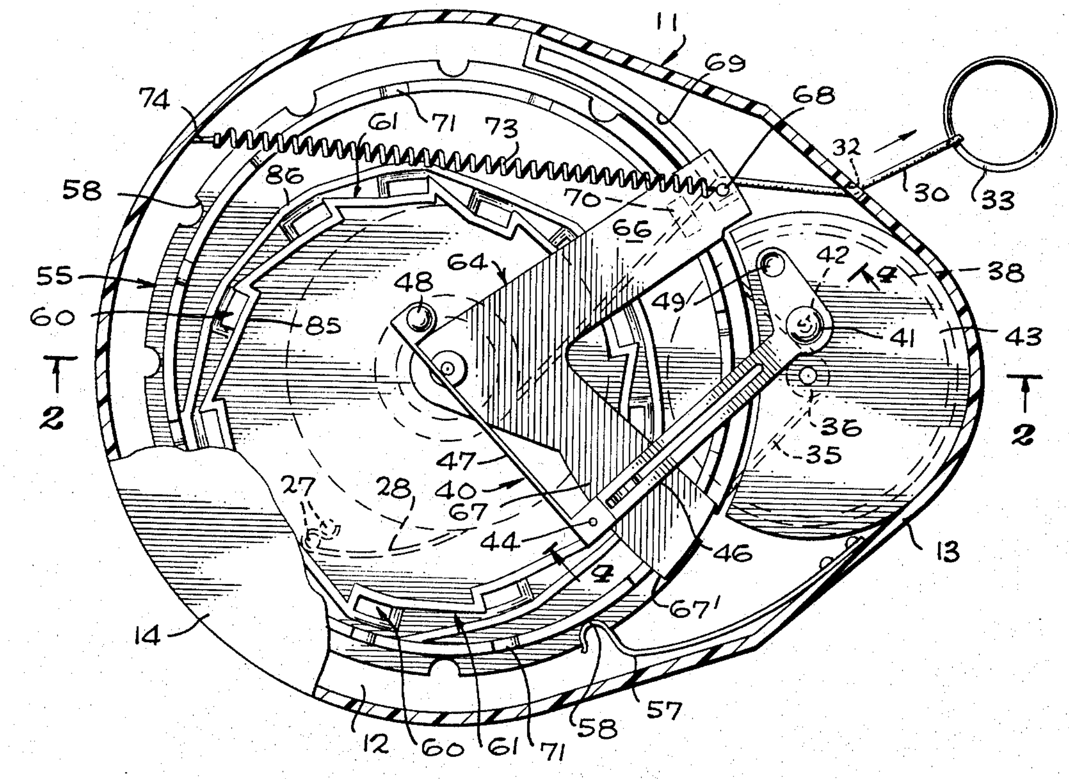
FIG. 1 is a plan view of a phonograph device embodying the invention with the diaphragm or upper wall of the case substantially broken away to expose the working parts.
Figure 2:
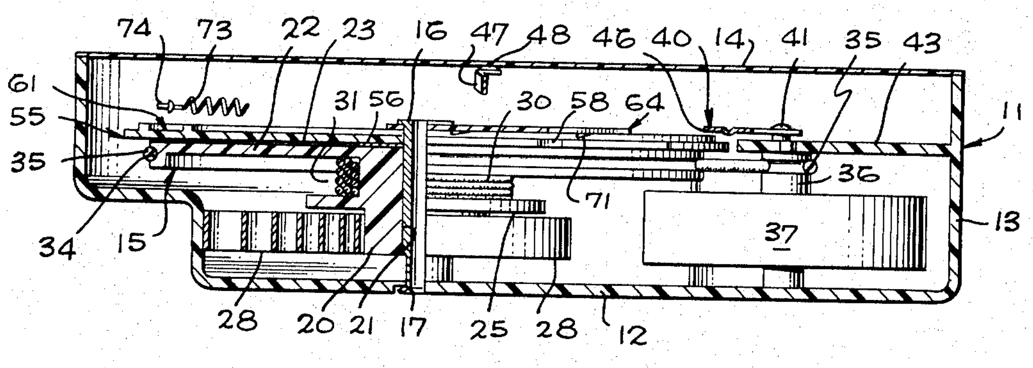
FIG. 2 is a sectional view on line 2—2 of FIG. 1.

More particularly describing the invention, reference numeral 11 generally designates a case which may be formed of any suitable material, such as plastic, for example. The case has a bottom wall 12 and a continuous side wall 13. An upper wall 14 of paper or plastic, which serves as a sound diaphragm, is shown closing the case and cemented to the upper edge of the side wall.

A phonograph record member 15 is journaled on a stationary shaft 16 in the form of a hollow rivet supported in a hole 17 in the bottom wall 12 of the casing. The record member is a combined turntable and record as will appear. It includes a relatively thick hub 20 which has a central bore 21 to rotatably fit about the shaft 16. At its upper end it is formed to provide a flange or disk portion 22 which serves as the phonograph record, suitable selections having been recorded on its surface 23 wherein a spiral record sound groove 24 is cut. A small flange 25 is spaced from the lower end of the hub and beneath this is a clock spring 28, the inner end of which is attached to the hub 20 in any suitable way and the outer end of which is secured to a post 27.

The spring 28 is wound by means of a pullstring 30 which is attached at its inner end in any suitable way to the hub of member 15 and wrapped therearound in the channel 31. The pullstring passes to the exterior of the case through a hole 32 in the side wall and is fitted with a finger ring 33 at its outer end. The record member 15 is provided with a peripheral groove 34 to receive a belt 35 which drives the shaft 36 of a governor 37 of any suitable type designed to regulate the speed of rotation of the record member when it is driven by the spring 28.

The sound reproducing means includes a tone arm 40 which is pivotally mounted on a rivet 41 provided in a hole 42 formed in a wall 43 in the casing. The tone arm is generally L-shaped in plan and has a stylus or needle 44 at the junction of the two legs 46 and 47, the needle being adapted to traverse the record groove. The free end of the tone arm has a dimpled end 48 which is adapted to glide across the undersurface of the diaphragm 14 and drive the same. The leg 46 of the tone arm is torsionally stressed by reason of the fact that were the tone arm not confined by the diaphragm 14, the end 48 would be above the plane of the diaphragm. The leg 46 has a laterally projecting dimpled foot 49 which rides on the wall 43 and resists the torsional stress in the leg 46.

As previously indicated, it is a particular feature of the invention that provision is made whereby preselected portions of the record surface or record groove can be reproduced selectively and in a predetermined sequence. This is particularly advantageous for toys, since it makes it possible to provide a series of question-answer recorded sequences whereby a child can operate the device once to have it enunciate a question, such as "How much is two times two?" and then operate it again to have it enunciate the answer, such as "Four." The construction to be described is also designed to be applicable to educational records for adults, such as language instruction records, it making possible the playing of a foreign language phrase in one cycle, followed by the translation thereof on the next cycle.

To accomplish the above, the record itself is recorded in accordance with a predetermined pattern so that preselected selections are provided on predetermined areas of the record. In the device itself, is what will be termed a play control disk, designated generally by numeral 55, which is rotatably mounted upon the same shaft 16 as the record and which is positioned just above the record surface 24. A washer 56 serves to space the members. Normally the disk 55 is stationary and is releasably held by an indexing means, such as a spring detent 57 which engages in recesses 58 in the periphery of the disk.

The play control disk 55 is provided with a plurality of windows 60 which are spaced circumferentially and are at different radial distances from the axis of rotation. These windows are connected in sequence by tracking means in the form of channels 61 in the outer surface of the disk. During the playing of a selection the needle 44 is received in one of the windows and projects therethrough to engage and reproduce the sound on the record. As the record rotates, each window of the play control disk exposes a predetermined area of the record surface different from that of any other windows, although if desired, certain windows could be made to expose the same portions of the record as others. It will be apparent, therefore, that the portion of the record played is determined by the position of the play control disk, since the needle must extend through one of the openings in the disk in order to engage the record and travel in the record groove.

For the purpose of advancing the play control disk, a reset lever 64 is provided just above the disk, being pivotally mounted on the center shaft or rivet 16. The lever may be variously shaped, however, the one shown is generally V-shaped in plan having two arms, designated 66 and 67, respectively. Arm 66 extends beyond the periphery of the disk and carries a depending post 68 which is freely received in an arcuate recess 69 formed in the bottom wall of the case. The undersurface of arm 66 is provided with a ratchet tooth 70 for engagement with circumferentially spaced ratchet teeth 71 on the upper surface of the control disk adjacent the periphery thereof. Thus when the lever is rotated clockwise from the position shown in FIG. 3 to that shown in FIG. 1 it serves to advance the control disk a predetermined amount equal to that necessary to cause the needle to be moved from one opening 60 in the disk to the next successive opening. The reset lever is actuated by the pullstring 30 which is trained around the depending post 68 of the arm 66. Return movement of the lever 64 is effected by a coil tension spring 73 connected between arm 66 and a post 74 in the case.

It will be apparent that the "at rest" or "normal" position of the reset lever 64, when the device is not in use, depends upon such factors as the length of pullstring 30 in relation to the length, size, strength, and number of coils of clock spring 28 and the strength of return spring 73. I prefer to adjust or so proportion these factors that, at the end of the playing cycle the pullstring 30 is pulled taut by spring 28 with ring 33 against the case with sufficient force to move the reset lever from the position it occupies in FIG. 3 to the position it occupies in FIG. 1.

In this latter position of the reset lever the needle is held elevated by the lever and is thus prevented from entering the adjacent window in the disk, the needle point being located at about the center of the outer periphery of the window.

Assuming then, that the parts are in the position of FIG. 1, when the pullstring 30 is pulled out to its full length, the reset lever 64 remains in the position of FIG. 1 and the needle is held in elevated position while the record is rotated reversely and spring 28 wound.

Figures 3, 6:
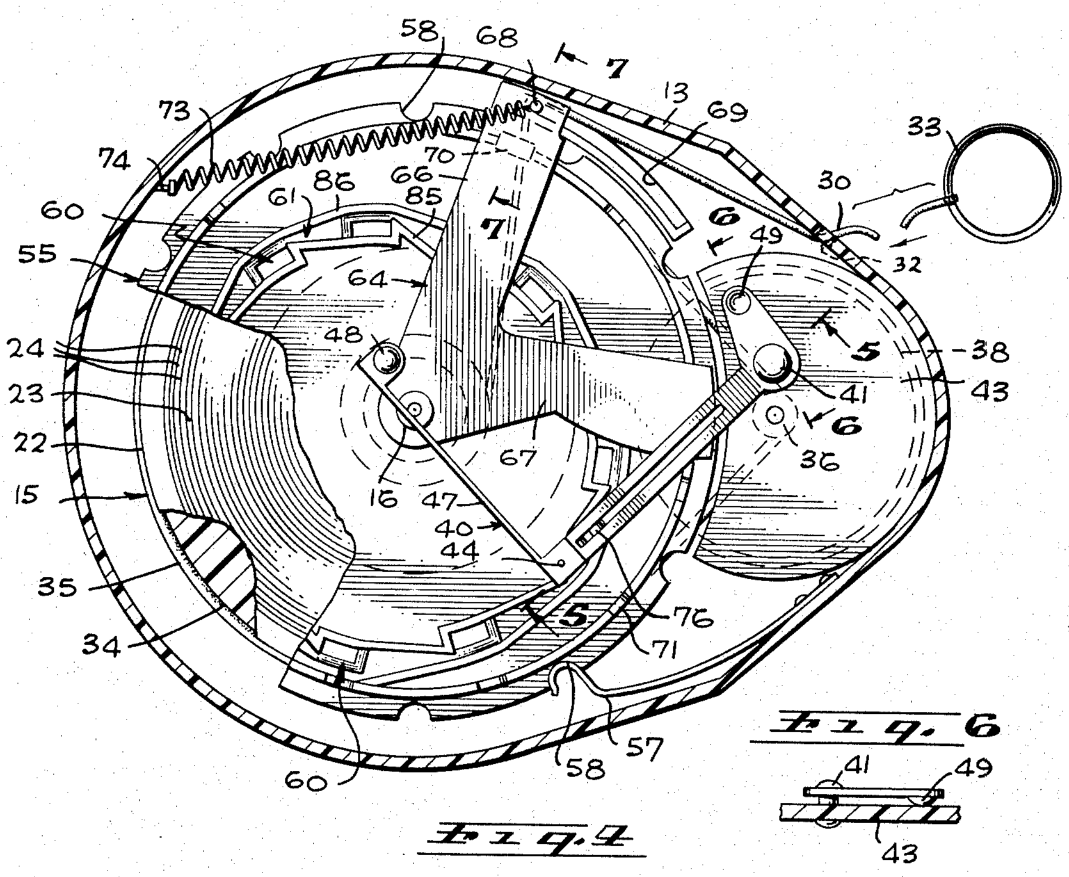
FIG. 3 is a view similar to FIG. 1, but showing the parts in the position occupied during play of a section of the record.
FIG. 6 is a fragmentary sectional view on line 6—6 of FIG. 3.
Figure 4:
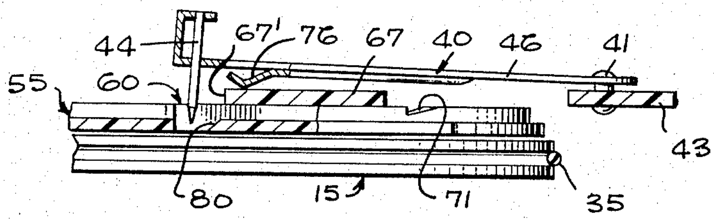
FIG. 4 is a fragmentary sectional view on line 4—4 of FIG. 1.
Figure 5:
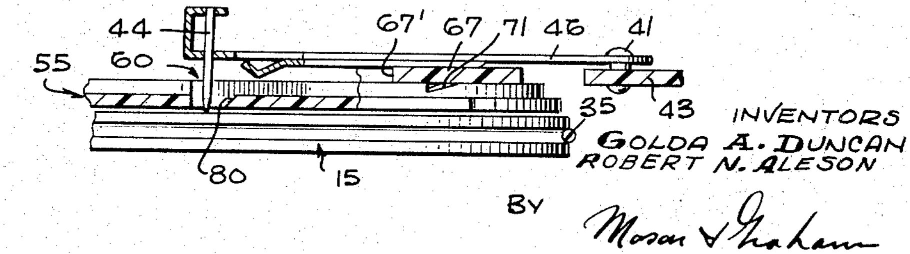
FIG. 5 is a fragmentary sectional view on line 5—5 of FIG. 3.
Figure 7:
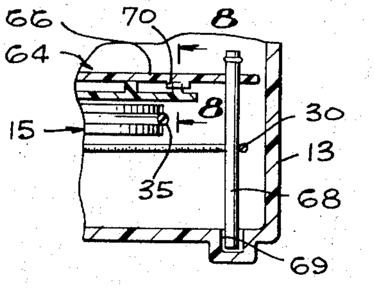
FIG. 7 is a fragmentary sectional view on line 7—7 of FIG. 3.
Figure 8:
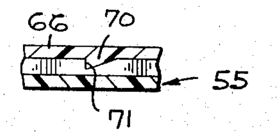
FIG. 8 is a fragmentary sectional view on line 8—8 of FIG. 7, but on a larger scale.

When the pullstring is released the pressure thereof against the pin 68 of the reset lever 64 is released and the return spring 73 rotates the lever counterclockwise approximately 30° to the position of FIG. 3 where the ratchet tooth 70 on the underside of the lever is positioned to engage a ratchet tooth 71 on the upper surface of the disk. This return movement of the lever allows the needle to engage the record, as will be further explained, and the playing of the selection is accomplished as spring 28 rotates the record and rewinds the pullstring.

When the playing cycle is nearly completed the pullstring 30 is placed under tension by the pull of the spring 28 and the pullring 33 is drawn against the case with sufficient force to tighten the string against the pin 68 of the reset lever and draw the lever around to (or substantially to) the position of FIG. 1. This action of the reset lever, due to the interengagement of the ratchet teeth 70, 71, advances the disk about 30° where it becomes releasably locked in place by engagement of detent 57 with a recess 58 in the periphery of the disk. As the disk advances the needle is engaged by the advancing inclined rear edge portion 80 of the window area and lifted, causing it to traverse the adjacent channel 61 to the region of the next window. The needle thus is lifted solely by means of the inclined surface 80 and remains in a lifted position as it traverses a channel 61. As the arm 67 of the reset lever advances, and the needle is about to drop into the next successive window 60, it is prevented from doing so by the leading edge 67' of lever arm 67, which has by then passed under a projection 76 on the underside of the tone arm leg 46. The projection 76 thus does not lift the tone arm but only prevents the needle from contacting the record during the re-wind cycle. When the pullstring is released, after having been fully pulled out as previously described, the inclined portion 76 cooperates with lever arm 67 to gradually lower the needle, to avoid damaging the record, as the reset lever is returned to the position of FIG. 3 under the influence of spring 73.

Figure 10:
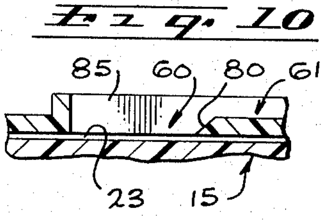
FIG. 10 is a fragmentary sectional view on line 10—10 of FIG. 9.
Figure 9:
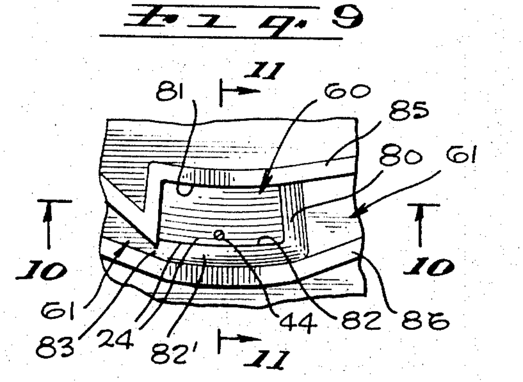
FIG. 9 is a fragmentary plan view of the portion of the control disk through which the needle projects in FIG. 3 and showing the needle in section, the view being on a larger scale than FIG. 3.
Figure 11:
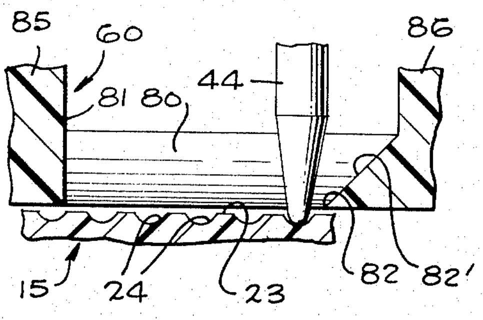
FIG. 11 is a fragmentary sectional view on line 11—11 of FIG. 9, but on a larger scale.

Referring now to FIGS. 9–11, it should be noted that the windows 60 appear to be generally rectangular, however, the inner and outer edges 81 and 82 are preferably formed to be arcuate about the center of the disk. The channels 61 are relatively wide at the rear edge of each window and then become increasingly narrow to terminate in a very narrow section 83 immediately ahead of the outer edge of the next window. The wall defining the outer edge of the window is downwardly and inwardly inclined at 82' so that the needle will descend along this surface and enter the first groove (or first turn of the overall record groove) which is exposed in the window, as best shown in FIG. 10. The channels 61 are formed by a guide wall means on the disk comprising an inner wall 85 and an outer wall 86 which serve to border the windows 60 and channels 61 and thereby insure against the needle escaping from its intended path from window to window when the control disk is advanced.

In the device as illustrated, the record is designed to rotate five turns per playing cycle and this is controlled by the length of the string, however, other means, such as a Geneva-type device, or a wall enclosing the spring to limit its outward expansion might be used but as both such means are well known in the art they are not herein illustrated.

The device as shown is intended for use in dolls and mechanical toys. The record is played clockwise from the outside in. The record has 60 playing grooves or turns and five grooves or turns are used for each playing cycle, so the record will play twelve separate messages. After playing the first band of five grooves at the outside, a 30° rotation of the control disk causes the needle to skip over the second band, to the start of the third band of five grooves. This process of playing alternate bands continues until the needle reaches the innermost band of grooves, after which it progresses by a reverse process toward the outside.

As the width of a band of five grooves or five turns is only .050 inch, the control disk can reset the needle across two bands of grooves if desired. The progression may be 1, 3, 5, 7, 9, 12, 11, 10, 8, 6, 4, 2, or any desired order, limited only by the angle of the channel connecting the windows.

Although I have illustrated and described a preferred form of my invention, I contemplate that various changes and modifications can be made therein without departing from the invention, the scope of which is indicated by the following claims.

We claim:

1. In a phonograph device, a support, a phonograph record member journaled on the support and having a spiral record groove in one face thereof, a normally stationary play control disk rotatably mounted on the support with its inner side adjacent the grooved side of the record and having a plurality of needle-receiving openings therein, said openings being spaced circumferentially and being at different radial distances from the center of the record whereby, as the record rotates, each opening exposes a limited area of the record, said play control disk having means forming a needle track on its outer side connecting said openings in sequence, sound reproducing means including a needle normally extending through one of said openings in said play control disk and engaging said record member, means for rotating said record member a limited number of turns generally corresponding to the number of turns of the record groove exposed through a window of the play control disk, and means for rotatively advancing said play control disk a predetermined amount sufficient to cause said needle to be moved from one opening in the play control disk along the needle track to the next adjacent opening therein.

2. The phonograph device set forth in claim 1 in which the means for rotating said record member and the means for advancing the play control disk are interdependent.

3. The phonograph device set forth in claim 1 in which the means for rotating said record member and the means for advancing the play control disk are each actuated by a single manually operable member.

4. The phonograph device set forth in claim 1 in which the means for rotating said record member is a spring, and in which a pullstring is provided for winding said spring and for actuating the means for advancing the play control disk.

5. The phonograph device set forth in claim 1 in which the means for advancing said play control disk includes a pivotally mounted reset lever operable to advance the play control disk.

6. In a phonograph device, a support, a phonograph record disk journaled on the support and having a spiral record groove in one face thereof, a normally stationary play control disk rotatably mounted on the support with its inner side adjacent the grooved side of the record and having a plurality of needle-receiving openings therein, said openings being spaced circumferentially and being at different radial distances from the center of the record whereby, as the record rotates, each opening exposes a limited area of the record, said play control disk having grooves in its outer surface connecting said openings in sequence, movable sound reproducing means including a needle normally extending through one of said openings in said play control disk and engaging said record, a pivotally mounted reset lever, interengaging means on said lever and said play control disk effective, upon forward movement of said lever, to advance said disk, drive means for rotating said record, and a manually operable means for moving said reset lever forward and for energizing said drive means.

7. The phonograph device set forth in claim 6 in which said manually operable means serves to limit the rotation of said record.

8. The phonograph device set forth in claim 6 in which spring means is provided for returning said reset lever.

9. The phonograph device set forth in claim 6 in which said play control disk, upon advancing in response to forward movement of the reset lever, engages and raises the needle from the record and in which said reset lever serves to hold said needle off the record when the needle is in position to enter the next opening in the play control disk until return movement of the reset lever.

10. In a phonograph device, a phonograph record having a spiral record groove means provided with a plurality of recorded selections occupying given areas, respectively, of the surface of the record, a needle engageable with the sound record, sound reproducing means associated with the needle, means operable to rotate the record, and means operable to cause said needle to be positioned to traverse the record groove means of said given areas of the record in a predetermined sequence, said means including a disk adjacent the record having a plurality of windows therein through which the needle extends to engage the record, and means for advancing the disk and causing the needle to be moved from one window thereof to another window thereof in sequence.

11. In a phonograph device, a support, a phonograph record journaled on the support and having a record groove in one face thereof, a play control element mounted on the support adjacent the grooved face of the record and having a plurality of needle-receiving openings therein exposing limited areas of the record, respectively, sound reproducing means including a needle normally extending through one of said openings in said play control element and engaging said record, means for rotating the record, and means for advancing one of said play control elements and said reproducing means relative to the other a predetermined amount sufficient to cause said needle to be moved from one opening in the play control element to another opening therein.

12. The phonograph device set forth in claim 11 in which said phonograph record is a disk and in which said play control element is disk-like.

13. The phonograph set forth in claim 11 in which the means for rotating the record, when actuated, rotates the same a limited number of turns generally corresponding to the number of turns of the record groove exposed through a window of the play control element.

References Cited

UNITED STATES PATENTS

| | | | |
|---|---|---|---|
| 3,211,460 | 10/1965 | Lea | 274—1 X |
| 3,245,688 | 4/1966 | Ryan | 274—1.1 |
| 3,282,590 | 11/1966 | Ashmele et al. | 274—1.3 |

HARRY N. HAROIAN, *Primary Examiner.*